US005127147A

United States Patent [19]

Toyoda

[11] Patent Number: 5,127,147

[45] Date of Patent: Jul. 7, 1992

[54] SEAL MOUNTING DEVICE OF AN ELECTRIC WIRE PROCESSING MACHINE

[75] Inventor: Mitsuo Toyoda, Tokyo, Japan

[73] Assignee: Japan Automatic Machine Co., Ltd., Tokyo, Japan

[21] Appl. No.: 626,954

[22] Filed: Dec. 13, 1990

Related U.S. Application Data

[63] Continuation-in-part of Ser. No. 390,184, Aug. 4, 1989, abandoned.

[30] Foreign Application Priority Data

Aug. 4, 1988 [JP] Japan ............................... 63-102767

[51] Int. Cl.[5] ........................ B23P 19/08; H01R 43/04

[52] U.S. Cl. ................................ 29/566.3; 29/33 M; 29/235

[58] Field of Search .................... 29/566.3, 566.4, 235, 29/33 M, 743, 748; 439/730, 854

[56] References Cited

U.S. PATENT DOCUMENTS 3,842,483 10/1974 Cramer ............................ 29/235 X
3,871,057 3/1975 Moulin ............................. 29/235 X
4,653,182 3/1987 Fukuda et al. .................... 29/235 X

FOREIGN PATENT DOCUMENTS 0225373 7/1985 German Democratic Rep. ... 29/235

*Primary Examiner*—Z. R. Bilinsky
*Attorney, Agent, or Firm*—Michael J. Striker

[57] ABSTRACT

A seal mounting device for use in an electric wire processing machine that cuts and removes an insulation from an end portion of an insulated electric wire, includes an openable and closeable guide part which correctly orients a deformed electric wire and keeps it oriented for mounting a seal thereon, and a seal holder positioned opposite to the guide part for mounting a seal on the electric wire as the guide part is closed for advancing the seal until it reaches a predetermined position on the electric wire as the guide part is opened. The guide part may also comprises a strip blade portion.

4 Claims, 3 Drawing Sheets

SEAL MOUNTING DEVICE OF AN ELECTRIC WIRE PROCESSING MACHINE

RELATED APPLICATIONS

This application is a continuation-in-part of application Ser. No. 390,184, filed Aug. 4, 1989, abandoned and entitled "Seal Mounting Device of an Electric Wire Processing Machine".

FIELD OF THE INVENTION

The present invention relates to a seal mounting device of an electric wire processing machine and which mounts seals for protection against water and/or dust.

BACKGROUND OF THE INVENTION

There are various types of seal mounting devices used in electric wire processing machines utilized, i.e. in forming electric wirings in automobiles. In connecting electric wirings of automobiles, the water and dust protections are indispensable to connections between units.

An electric wire processing machine of which the invention is a part, cuts off (at "b") a certain amount of insulation on the ends of the wire "a", as shown in FIG. 3, mounts waterproof seals "c" thereon, and finally further urges terminals "d" thereon.

In this case, the waterpoof seal "c" is generally made of rubber materials for improving the seal tightness and has a smaller inner diameter than the outer diameter of the wire.

In conventional techniques, the end parts of electric wires "a" are stripped, on which the seals "c" are mounted, and terminals "d" are attached under pressure thereto (FIG. 3(*d*)). If operations, from the stripping at the end part of the electric wire till the attaching of the terminal "d", are carried out through a series of steps with the clamping tool "e", the stripped amount of the insulation from the clamping tool "e" to the end of the wire "c" should be large because of the requirements of the mounting process of the terminal "d".

However such a large amount of insulation stripping causes the electric wire to bend with a result of inconvenience in mounting the seal thereon.

SUMMARY OF THE INVENTION

Accordingly, it is an object of the invention to provide a seal mounting device that insures exact and stable carrying out of the seal mounting operation.

The object of the invention is achieved by providing a seal mounting device for use in an electric wire processing machine. The seal mounting device comprises an open-closed guide element for correcting deformation of an end portion of a processed electric wire and for maintaining a proper orientation of the end portion of the electric wire. Seal holder means is aligned with the guide element for holding a seal and for mounting a seal on the end portion of the processed electric wire in a closed condition of the guide element and for thereafter advancing the seal to a predetermined position on the end portion of the processed electric wire in an open condition of the guide element.

Other objects, features and advantages of the invention will become more apparent from the following detailed description of the preferred embodiments when read with reference to the accompanying drawings.

DETAILED DESCRIPTION OF THE PREFERRED EMBODIMENTS

Figure 1:
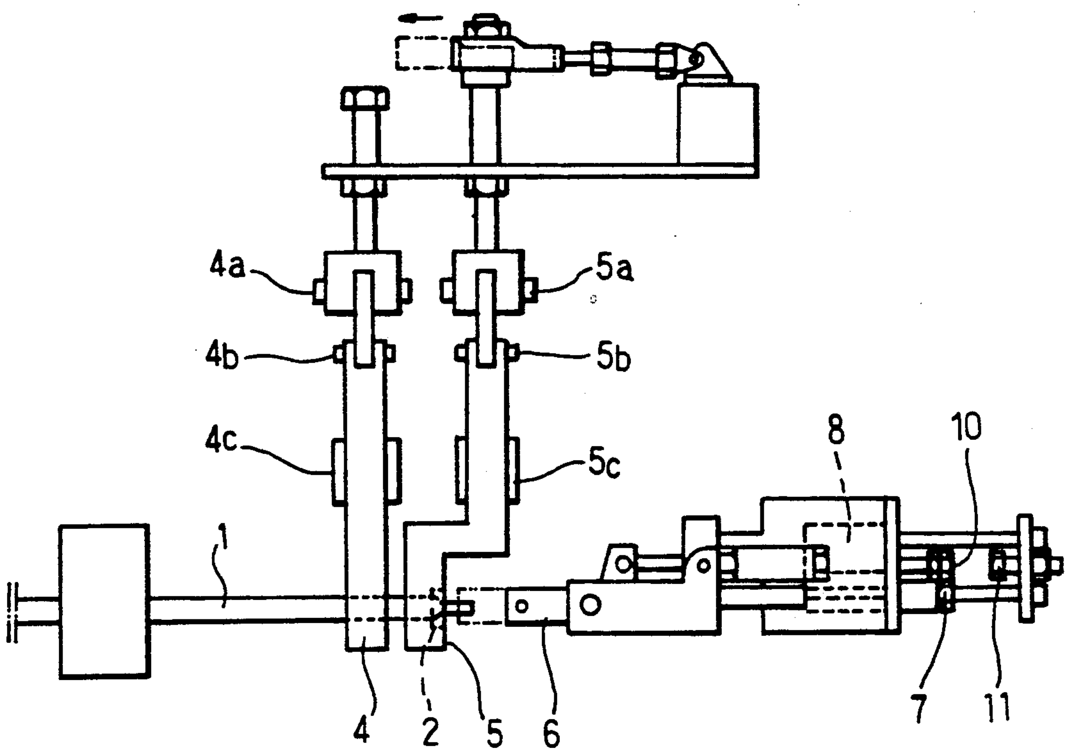
FIG. 1 is a side view of a first embodiment of a seal mounting device according to the invention.

FIG. 1 illustrates a first embodiment of the invention, in which the electric wire 1 is held by a clamping tool 4, and is maintained in a correct orientation by a guide plate 5 which is provided with a strip blade portion 2 which is aligned with respect to a seal held within a seal holder 6.

Figure 5B:
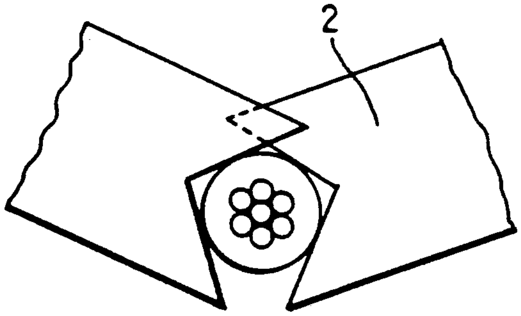
FIGS. 5*a*–5*c* are front views of a guide plate with strip blade portions in different positions of the strip blade portion.
Figure 5A:
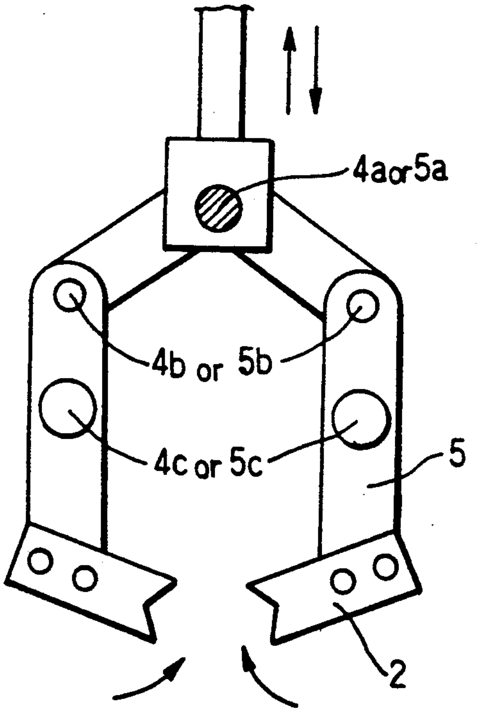
Figure 5C:
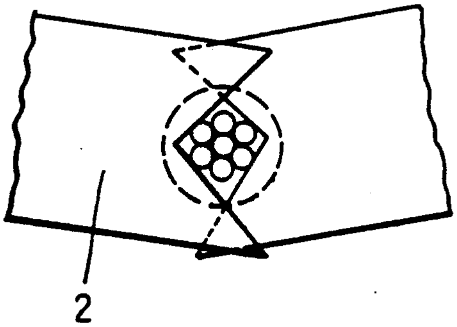

A rod of an air pressure cylinder 4a which extends to the clamping tool 4, assures stable holding of the electric wire 1 in one stepped action through parts 4*a*, 4*b*, 4*c*. On the other hand, a rod of an air pressure cylinder 5*a* which extends to a guide plate 5, performs two stepped actions. That is, by a first action, the electric wire 1 is slightly held (FIG. 5(*b*)) at a portion to be stripped by the strip blade portion 2 and is aligned with respect to a seal to be mounted on the wire, and subsequently by a second action, the strip blade 2 cuts into the insulation of the wire 1 (FIG. 5(*c*)). When the seal holder 6 moves back, the cut insulation of the wire 1 is stripped.

In FIG. 1, the seal holder 6 holding the seal is advanced toward the electric wire 1 by an air cylinder 7. The holder 6 mounts the seal on the wire 1 until a position indicated by two dotted lines, is reached. The operation is effected with cylinders 7 and 8.

The motive power of the cylinder 8 is stronger than that of the cylinder 7. Therefore, even if the rod of the cylinder 7 is actuated, it stops at a position where a stopper 10 contacts a positioning screw 11. If the air pressure of the cylinder 8 is changed, the rod having the stopper 10 at its end retreats, and the rod of the cylinder 7 moves forward by a remaining stroke.

Thus, two-step action is performed with the cylinders 7 and 8.

Figure 3A:
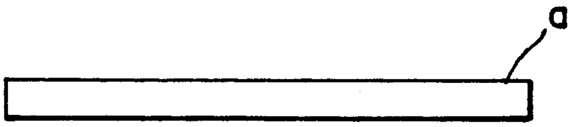
FIGS. 3*a*–3*d* are side views showing the mounting sequence of seals and terminals on an electric wire.
Figure 3B:
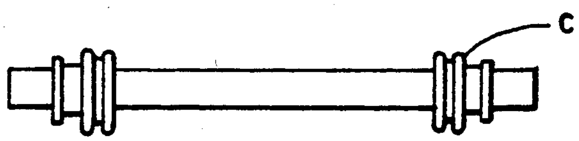
Figure 3C:
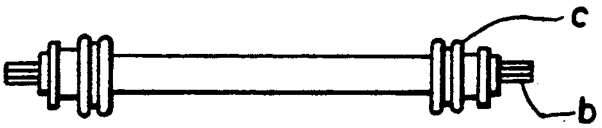
Figure 3D:
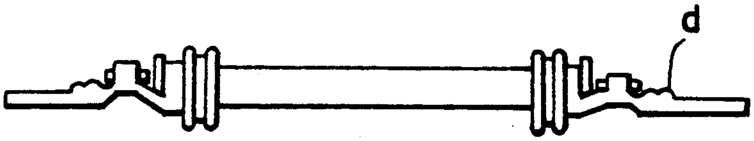
Figure 4:
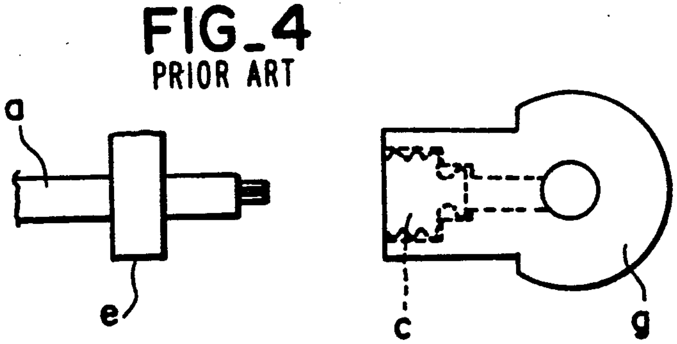
FIG 4 PRIOR ART
FIG. 4 is a side view of a conventional seal mounting device.

When the positioning screw 11 contacts the stopper 10, the seal holder 6 of FIG. 1 reaches a position shown with the two-dotted line. Then, when the pair of strip blades 2 opens as stated above, the stopper 10 is pulled by the cylinder 8, and the seal holder 6 is advanced forward by the cylinder 7, so that the seal is mounted at a predetermined position as shown in FIG. 3(C). When the seal is mounted at the desired position, the pressure of the cylinder 7 is changed and the rod with the seal holder 6 at its end is withdrawn and, thereafter, the guide plate which holds the electric wire 1 closes so that the strip blade portion 2 cuts into the insulation of the wire, and the clamping tool 4 releases the electric wire, and another, not shown, clamping tool positioned after the clamping tool 4, strips the insulation.

Figure 2:
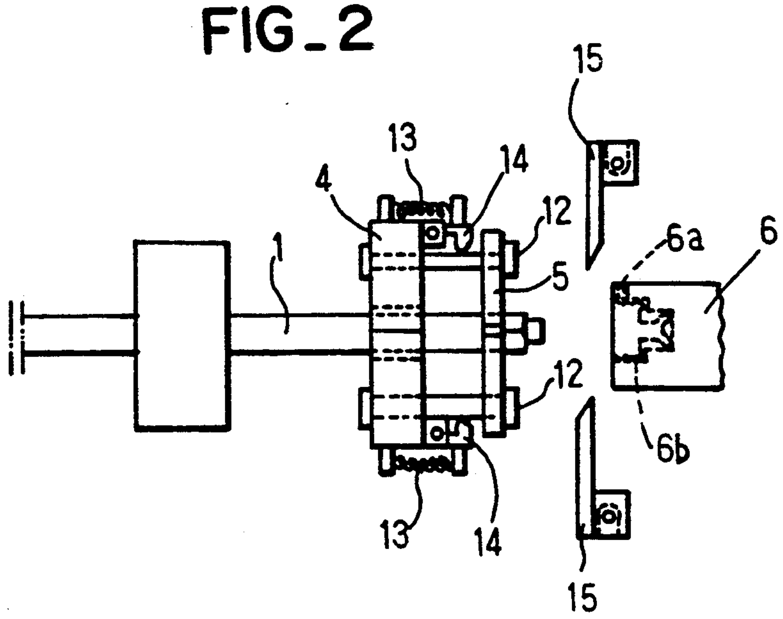
FIG. 2 is a side view of a second embodiment of a seal mounting device according to the invention.

FIG. 2 shows a second embodiment of the invention. The electric wire 1 is held by a clamping tool 4, and a guide plate 5 is supported on shafts 12. The guide plate 5 is adapted to slide in an axial direction of the electric wire. While an external force applied to the clamping tool 4, does not act on the guide plate 5, the guide plate 5 retains its position near the end of the electric wire.

A seal holder 6 is formed with a hole 6b having a diameter somewhat larger than an outer diameter of the seal for holding the seal therein, and is further formed with an air passage 6a at an appropriate portion of the seal holder 6. An air vacuum is effected within the whole 6b in a normal manner to hold the seal in the hole 6b.

In this condition, the seal holder 6 with the seal is advanced by the cylinder 7 toward the electric wire to be processed. When the seal is mounted on the electric wire, and the seal holder 6 further advances, the guide plate 5 is withdrawn so that it does not hold the electric wire 1 at the axial position, and the seal may be mounted at the predetermined position of the electric wire (FIG. 3(B)). When the guide plate 5 moves toward the clamping tool 4, hooks 14 formed at the clamping tool 4 catch the guide plate 5. When the condition, shown in FIG. 3(B)) is thus obtained, a pair of strip blades 15 independent of the clamping tool 4, hold and cut into a predetermined part of the insulation of the electric wire, and the clamping tool 4 opens to release the electric wire. Subsequently, a not shown wire holding part is actuated to pull the electric wire and remove the insulation (FIG. 3(C)).

At the same time, the clamping tool 4 opens, the hooks 14 are released, and the guide plate 5 returns to its initial position.

In the foregoing process, the inconvenience of the seal mounting caused by bending inclination of the electric wire is eliminated, and an exact operation is secured.

The present invention will be summarized as follows:

1) The seal mounting device of the electric wire processing machine for cutting and removing the end parts of the insulation of the electric wire, is provided with an open-close guide part which corrects deformation at the end part of the wire and keeps it oriented. The seal held by the seal holder, is mounted on the electric wire when the guide part is closed, and is further mounted until reaching a predetermined position as the guide part is opened (FIG. 1).

2) The guide part has a strip blade portion (FIG. 1).

3) The guide part is movable in a direction of holding the electric wire (FIG. 2).

4) The guide part is retreated as the seal holder advances, and the seal is mounted on the electric wire while the wire remains oriented (FIG. 2).

5) The guide part cooperates with opening and closing of the wire holder, and opens when the wire holder opens and advances at the same time. When the wire holder closes, the guide part goes back to the wire holder. When the seal is mounted, and the seal holder is withdrawn, the guide part is closed to maintain the retreating position, and the clamping tool releases the holding by opening of the clamping tool (FIG. 2).

The present invention insures that the seal is mounted on the electric wire stably at the appropriate length without particular delay within a cycle time.

While the invention has been illustrated and described as embodied in a seal mounting device of an electric wire processing machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A seal mounting device for use in an electric wire processing machine, the seal mounting device comprising a clamping tool for holding an electric wire; a guide plate which is axially slidably supported in opposition to said clamping tool force; a spring provided on said clamping tool; hooks disposed on said clamping tool and normally pushing said guide plate by means of said springs; a pair of strip blades independent of said clamping tool; and a seal holder (16) which is formed with a hole for holding a seal therein, and is also formed with an air passage for effecting an air vacuum within said hole to hold the seal therein, said seal holder with the seal being advanced toward the electric wire to be processed so as to mount the seal on the electric wire, and said seal holder being further advanced so that said guide plate is withdrawn as holding the electric wire at an axial position and the seal can be mounted at a predetermined position of the electric wire, whereby said guide plate is caught by said hooks provided on said clamping tool to create a space by said strip blades and the strip blades hold and cut into a predetermined part of an insulation of an electric wire, and subsequently said clamping tool opens to release the electric wire, and the electric wire is pulled thereby removing the insulation.

2. A seal mounting device for use in an electric wire processing machine, said seal mounting device comprising an open-closed guide element including a strip blade for correcting deformation of an end portion of a processed electric wire and for maintaining a proper orientation of the end portion of the electric wire; means for opening and closing said guide element; and seal holder means aligned with said guide element for holding a seal and for mounting a seal on the end portion of the processed electric wire in a closed condition of said guide element and for thereafter advancing the seal to a predetermined position on the end portion of the processed electric wire in an open condition of said guide element.

3. A seal mounting device as set forth in claim 2, further comprising a stop for determining a mounting of the seal on the end portion of the processed electric wire.

4. A seal mounting device as set forth in claim 2, wherein the guide element is movable in a longitudinal direction of the processed electric wire.

* * * * *